Feb. 7, 1961   F. A. DOLL   2,970,905
METHOD OF MAKING A COMPOSITE SINTERED POWDERED MATERIAL ARTICLE
Filed Sept. 18, 1957
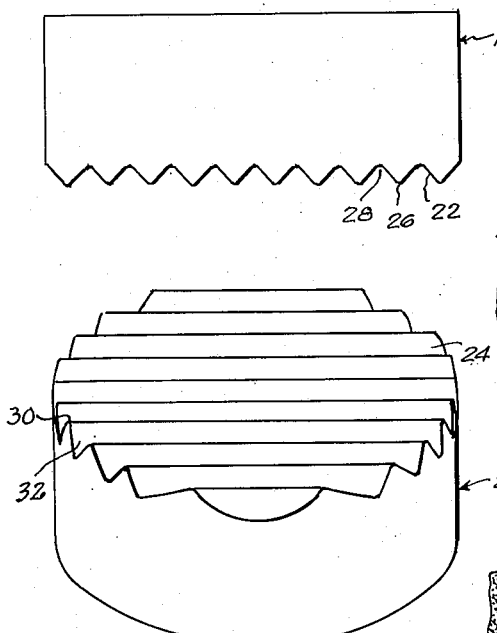
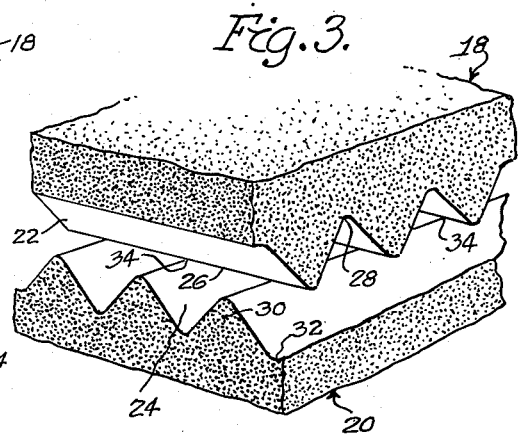
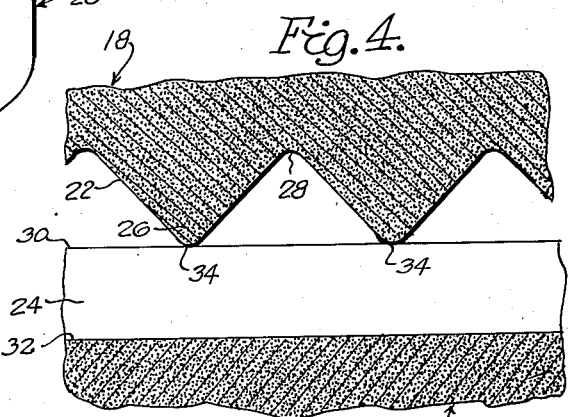
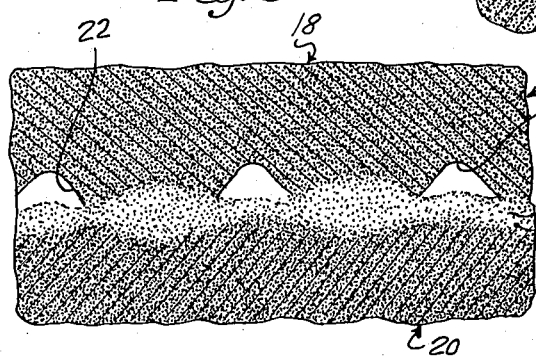
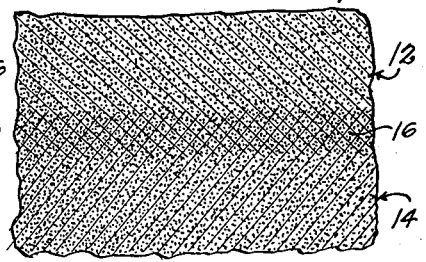
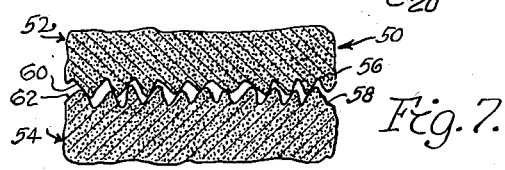
INVENTOR.
Frank A. Doll
BY Barthel + Bugbee
Attys

United States Patent Office 2,970,905
Patented Feb. 7, 1961

2,970,905

METHOD OF MAKING A COMPOSITE SINTERED POWDERED MATERIAL ARTICLE

Frank A. Doll, Detroit, Mich., assignor to Haller, Inc., Plymouth, Mich., a corporation of Michigan Filed Sept. 18, 1957, Ser. No. 684,699

9 Claims. (Cl. 75—208)

This invention relates to powder metallurgy and, in particular, to the manufacture of composite sintered powdered material parts.

One object of this invention is to provide a method of making composite sintered powdered metal parts involving uniting separately-molded powdered material parts into a substantially integral body or article wherein the junction surfaces disappear and the composite body has exceedingly high structural strength at the junction of the united parts.

Another object is to provide a method of the foregoing character wherein the junction between the parts consists of a zone in which loose particles from the two parts are intermingled and united by sintering so that no definite plane or surface of junction exists and consequently no plane of weakness exists.

Another object is to provide a method of the foregoing character wherein the parts to be united are provided preferably during molding with multiple serrations, ridges or projections at their faces to be united, after which the parts are arranged with the serrations or ridges crossing each other so that the opposed serrations or ridges have substantially point contact with one another, pressing being then continued to cause the concentrated pressure of such point to point contact to break down the serration or ridges into loose particles which intermingle with one another, after which pressing is continued to the final density desired and sintering is carried out to unite the intermingled particles in the junction zone, resulting in a joining of the particles without perceptible junction and, in many cases, with a structural strength as great or even greater than the structural strength elsewhere in the parts so that breakage during test frequently occurs elsewhere than in the junction zone.

Other objects and advantages of the invention will become apparent during the course of the following description of the accompanying drawings, wherein:

Figure 1 is a side elevation of one of the molded powdered material parts to be united with another according to the method of the invention, showing the serrated surfaces at the proposed junction;

Figure 2 is a perspective view, looking from above, of a second part to be united to the part shown in Figure 1, and having a similar serrated junction surface;

Figure 3 is an enlarged fragmentary perspective view of small blocks removed from the parts of Figures 1 and 2, showing the manner of superimposing the serrations transversely upon one another to create substantial point-to-point contact between the serrations, prior to final pressing;

Figure 4 is a still further enlarged fragmentary cross-section of Figure 3;

Figure 5 is a fragmentary cross-section similar to Figure 4 but showing the pulverization of the contacting portions of the serrations of the upper and lower parts after final pressing has been partially completed;

Figure 6 is a fragmentary cross-section of a finally pressed and sintered composite body or article forming a portion of the parts of Figures 1 and 2, joined according to the invention, showing the junction zone of sintered intermingled particles; and Figure 7 is a fragmentary cross-section of the modification of the invention employing protuberances at the superimposed surfaces.

Hitherto, the manufacture of articles, such as parts of machines, has been greatly facilitated by making them out of molded and sintered powdered material, such as powdered metal, thereby eliminating many cutting and other machining operations previously required and consequently reducing the cost of manufacture as well as enabling the production of parts which have shapes difficult to machine or produce by any other process. The production of such sintered powdered metal parts, however, is limited by the necessity of such parts being capable of being molded. Where the parts are too complex to be molded, such as where internal chambers or cavities are desired, great difficulty has been encountered in satisfactorily uniting separately molded powdered metal parts by reason of the fact that the separate molding or pressing of the individual parts creates dense, smooth junction surfaces which even though molded to mating configurations, nevertheless do not unite properly with one another because of their smoothness and of the flatness and densification of the particles in these surfaces. As a consequence, these dense surfaces produced by prior methods of uniting powdered metal parts have prevented the production of a satisfactory bond between the surfaces, with the result that under test or under stress in use the parts are likely to separate at their junction surfaces by reason or the plane or surface of weakness produced at their junction.

The present invention provides a method whereby the densification of the mating surfaces of the two or more powdered metal parts to be joined is broken up and loose particles produced which are intermingled in a junction zone as the parts are pressed together. Subsequent sintering unites the loose and intermingled particles and, the formation of dense junction surfaces having been prevented, results in a junction zone which is substantially indistinguishable in structural strength and appearance from other portions of the united parts remote from the junction zone. Some tests, indeed, have resulted in breakage taking place at locations other than the junction zone between the two parts, indicating that the junction zone is as strong, if not stronger, than other portions of the parts, unlike the weakened junctions or prior united powdered metal parts.

Referring to the drawings in detail, Figure 6 shows in enlarged cross-section a portion of a composite sintered powdered metal article or body, generally designated 10, composed of upper and lower molded powdered metal portions 12 and 14 respectively which have been joined or united to one another at a junction zone 16 in which their particles have been intermingled and interlocked, according to the method of the invention. The parts shown in the figure have been indicated as approxmiately cylindrical in shape for the purpose of simplicity of disclosure, it being understood that the general shape of the parts to be united is immaterial so long as they are capable of being molded and pressed together.

In carrying out the method of the invention, the operator first produces two or more unsintered molded powdered material parts or briquettes, generally designated 18 and 20 respectively, of powdered metal, nylon or other suitable material according to conventional molding procedure for powdered material articles, except that the parts 18 and 20 are provided with serrated junction faces 22 and 24 respectively, such as by providing the part 18 with alternating ridges 26 and grooves 28 and the part 20 with alternating ridges 30 and grooves 32, these being preferably of approximately V-shaped or wedge-shaped cross-section. In producing such serrated surfaces 22 and 24, it is of course understood that the molding dies are preferably serrated to form the serrations in the molded parts. The method of the present invention may be carried out with various kinds of powdered metals, powdered iron or bronze being most frequently employed.

The pressing procedure employed in separately molding the parts or briquettes 18 and 20 necessarily results in densified serrated surfaces 22 and 24, as in the production of prior parts with smooth or substantially flat surfaces to be joined to one another. This disadvantage, however, is overcome by superimposing the parts 18 and 20 in a suitable final-pressing die or mold (not shown) with the serrations 26 and 30 arranged in crossing or transverse relationship as shown in Figure 3, also known as crisscross relationship. Final pressing is then carried out, an intermediate stage being shown in Figure 5.

Due to the fact that the transverse or crossing arrangement brings about substantial point-to-point contact at the crossing points of the ridges 26 and 30 (Figure 4), such as at the points of contact 34 therebetween, the pressure is first concentrated at the points of contact 34. As a result, the unsintered parts 18 and 20 crumble at the points of contact 34 and progressively crumble at locations between the points 34 at the tops of the ridges 26 and 30 and the grooves 28 and 32, resulting in the production of an intervening layer 36 of loose particles 38 of metal or other suitable powdered material from both sets of ridges 26 and 30 (Figure 5). Pressing is continued and the unsintered parts 18 and 20 pressed further toward one another beyond the state shown in Figure 5 until the ridges 26 and 30 have been crumbled or demolished to a sufficient extent to fill up the remaining portions of the grooves 28 and 32 with the layer 36 of loose particles 38 and until the finally-desired density is achieved. These loose particles 58 (Figure 5) are mostly larger than the original powdered metal particles which were compressed to form the original briquettes 18 and 20, hence in order to produce such larger loose particles 38, the serrations 26 and 30 are necessarily of larger sizes than the sizes of such original powdered metal particles from which the briquettes 18 and 20 were formed.

The resulting composite briquette, generally designated 40, is then removed from the die and sintered in a conventional sintering oven so as to cause uniting of the particles in the layer 36 with one another and with the adjoining portions of their respective parts 18 and 20, thereby producing the sintered powdered metal article 10 shown in Figure 6. The sintering may be carried out in a conventional sintering oven by methods and apparatus well-known to those skilled in the powder metallurgy art, and with or without the use of a conventional protective atmosphere, such as hydrogen.

The slightly modified method illustrated in Figure 7 is similar in principle to the method of Figures 1 to 6 inclusive, but the assembly or resulting composite briquette 50 including upper and lower briquettes 52 and 54 instead of having ridges at their junction faces 56 and 58 have protuberances 60 and 62 respectively. These protuberances 60 and 62 may be nubs, cones, pyramids or the like. The lower protuberances 62 are preferably spaced differently or of different sizes than the upper protuberances 60 so as to engage the side walls thereof rather than engaging the apices head-on or interlocking in mating engagement, either of which situations would not provide the lateral component of force needed to enhance crumbling and disperse laterally the particles resulting from the crumbling, as shown in Figure 5. In other respects the method of Figure 7 and the action resulting therefrom is similar to that of Figures 1 to 6 inclusive and further discussion therefore is believed to be unnecessary.

The sintering of the parts 18 and 20 or 52 and 54 and the consequent interlocking of the particles in the loose particle layer between them, results in the production of the junction zone 16 between the finally-sintered portions 12 and 14 resulting from the unsintered molded parts 18 and 20 or 52 and 54. In Figure 6, the crisscross section lines indicate the approximate location and boundaries of the junction interzone in the body or article 10, but in practice this interzone, after sintering, is virtually indistinguishable in appearance from the remainder of the article or body 10. Strength tests performed on composite articles made according to the method of the present invention have indicated that the structural strength of the body or article 10 is even greater in the interzone 16 than in the parts 12 or 14 adjacent the interzone 16, because of the fact that breakage of the composite article 10 under test in a testing machine frequently occurred at locations other than in the interzone 16.

What I claim is:

1. A method of making a composite sintered powdered material article, comprising pressing first and second masses of particles of sinterable powered material into first and second briquettes having corresponding faces shaped with approximately mating surfaces adapted to approximately fit one another, forming on said corresponding faces multiple composite serrations of larger sizes than the sizes of the original particles of powdered material of which the briquettes were composed, said serrations having recesses disposed therebetween, each serration being composed of a multiplicity of said original particles, placing said first and second briquettes against one another with their corresponding serrated surfaces disposed in opposing abutting engagement with one another and with the opposing recesses between the opposing serrations forming intervening open spaces, pressing the thus-abutting briquettes against one another with a pressing force of sufficient magnitude to break down the opposing serrations into particles entering said intervening open spaces and form a composite briquette with an intervening layer of relatively loose intermingling particles between said abutting briquettes, further pressing the composite briquette to the density desired therefor, and sintering the composite briquette to form a sintered composite powdered material article.

2. A method of making a composite sintered powdered material article, according to claim 1, wherein the step of placing the corresponding serrated surfaces in abutting engagement with one another includes disposing the serrations of said first and second briquettes in substantial point-to-point engagement with one another.

3. A method of making a composite sintered powdered material article, according to claim 1, wherein the step of forming the serrations comprises forming ridges on said briquette faces and wherein the step of placing the corresponding serrated surfaces in abutting engagement with one another includes disposing the ridges of said first and second briquettes in criss-cross relationship to each other.

4. A method of making a composite sintered powdered material article, according to claim 3, wherein the step of placing the corresponding serrated surfaces in abutting engagement with one another includes disposing the thuscrossed ridges of said first and second briquettes in substantial point-to-point engagement with one another.

5. A method of making a composite sintered powdered material article, according to claim 1, wherein the step of further pressing of the composite briquette includes continuing the pressing of the briquettes until the loose material particles in the intervening layer move further relatively to one another into interlocking compacted engagement with one another.

6. A method of making a composite sintered powdered material article, according to claim 3, wherein the step of forming the serrations on said briquette faces comprising forming ridges thereon of substantially uniform sizes.

7. A method of making a composite sintered powdered material article, according to claim 3, wherein the step of forming the serrations on said briquette faces comprising forming ridges on each briquette disposed substantially parallel to one another.

8. A method of making a composite sintered powdered material article, according to claim 1, wherein the step of forming the serrations comprise protuberances.

9. A method of making a composite sintered powdered material article, according to claim 8, wherein the step of placing the corresponding serrated surfaces in abutting engagement with one another includes disposing the protuberances principally in mutual engagement with their side slopes intermediate their bases and apices whereby to impart lateral crumbling force to the protuberances.

References Cited in the file of this patent

UNITED STATES PATENTS

| | | |
|---|---|---|
| 1,712,507 | Lawson | May 14, 1929 |
| 1,767,220 | Malm | Jan. 24, 1930 |
| 1,989,186 | De Bats | Jan. 29, 1935 |
| 2,251,410 | Koehring et al. | Aug. 5, 1941 |
| 2,703,750 | Cotter | Mar. 8, 1955 |
| 2,725,265 | Daniels et al. | Nov. 29, 1955 |
| 2,775,024 | Seal | Dec. 25, 1956 |